3,362,920
COATINGS COMPRISING CHLOROSULFONATED POLYETHYLENE AND BUTYRATED CELLULOSE
Taki J. Anagnostou and Harry J. Golub, Grand Rapids, Mich., assignors to Guardsman Chemical Coatings, Inc., Grand Rapids, Mich., a corporation of Delaware
No Drawing. Filed Mar. 17, 1965, Ser. No. 440,639
6 Claims. (Cl. 260—17)

This invention relates to a novel method for curing chlorosulfonated polyethylene and to novel protective coating film employing a chlorosulfonated polyethylene as one of the reactants. More particularly this invention relates to a novel method for curing chlorosulfonated polyethylene by employing as the curing agent a cellulose ester of the type described hereinafter. The invention also includes novel conversion coatings formed by the reaction of a chlorosulfonated polyethylene and a cellulose ester of the aforementioned type.

It is known that chlorosulfonated polyethylenes possess many properties which would make them valuable ingredients of protective coating products. However, they are lacking in satisfactory conversion properties to give tack free coating films of good physical strength and durability. The chlorosulfonated polyethylenes are highly resistant to the atmospheric elements to which protective coatings are normally exposed. However, such applications have heretofore been limited because of inadequate means of converting them by practical methods to tack free films.

One attempt to overcome the surface tacky character of the chlorosulfonated polyethylenes was that of milling therewith varying portions of powdered polyethylene. These systems after rather short periods of storage in a solvated state, such as a formulated paint, tend to give physical separation causing, as observed in the form of hazy films, a loss of film strength through discontinuity. The use of such modifiers (e.g., powdered polyethylene or organic plasticizers) contributes no crosslinking function for transforming films therefrom into tridimensional polymers.

On the other hand crosslinking agents which have been suggested for conversion of the chlorosulfonated polyethylenes, such as lead oxide, magnesium oxide or tribasic lead maleate along with accelerators such as tetraethyl thiuram disulfate, 2-mercaptoimidazoline or diorthotolyl guanidine tend to give opaque discontinuous films and convert too slowly to permit rapid processing in such applications as factory prefinishing of paneling and siding.

Another stringent requirement of coating materials for application in the prefinish siding and paneling industries is that they retain good flexibility at subzero temperatures. Physical mixtures of polymers not only are subject to separation at low temperatures but tend to become brittle as a result of this separation thereby giving failure of their coating films in cold climates due to film fracture.

It has now been found that blends of butyrated celluloses, such as cellulose acetate butyrate and cellulose butyrate, with the chlorosulfonated polyethylene surprisingly give coating films of excellent clarity, of rapid cure to tack-free character and possessing excellent subzero flexibility. This is believed to result from crosslinking as indicated by infra red data and appears to show functional group changes in the structure of the butyrated cellulose and the chlorosulfonated polyethylene which may account for the uni-polymer character of the cured films.

Chlorosulfonated polyethylenes are prepared by the simultaneous chlorination and chlorosulfonation of polyethylene in solution with gaseous chlorine and sulfur dioxide. An example of one method for making a chlorosulfonated polyethylene product is shown in U.S. Patent 2,405,971. These aliphatic polymers usually contain anywhere from 0.8 to 1.6 percent sulfur and 25 to 45 percent chlorine. Typical chlorosulfonated polyethylenes are the commercial "Hypalons" marketed by E. I. du Pont de Nemours & Co.

Butyrated cellulose polymers useful in the instant invention consist of cellulose whose hydroxyl groups have been esterified with butyric acid or mixtures of butyric acid with other organic acids. Preferable cellulose polymers contain up to 3% by weight free hydroxyl content, 6% to 57% by weight of butyryl content and 0 to 37% by weight acetyl content. Examples of these polymers are the commercial "EAB" cellulose acetate butyrate series marketed by Eastman Chemical Products, Inc.

In preparing the composition of the present invention the chlorosulfonated polyethylene and cellulose butyrate are dissolved in an organic solvent, a suitable solvent being methyl isobutyl ketone, and blended together in the desired ratio. Useful coatings can be obtained by incorporating of from 10 to 70 percent by weight cellulose butyrate with 90 to 30 percent of chlorosulfonated polyethylene, however, the preferable range of cellulose butyrate is 10 to 40 percent with 90 to 60 percent chlorosulfonated polyethylene, depending upon the application to be made of the coating. Generally, the cure can be accelerated by using a small amount of an amine catalyst such as diethylene triamine. Quantities of 0.01 to 0.05 equivalent of amine per 100 parts of chlorosulfonated polyethylene based on an equivalent weight of amine containing one amine nitrogen are generally used. While not required it is occasionally desirable to supplement the combining of chlorosulfonated polyethylene and cellulose butyrate with additional modifiers of the litharge or lead trimaleate type along with a rubber vulcanizing accelerator such as tetraethyl thiuram disulfide.

Infra-red studies of preconverted films and converted films of coating mixtures of the butyrated cellulose and the chlorosulfonated polyethylene appear to indicate acid interchange between the organic acid and the sulfonic acid groups which could result in the liberation of volatile organic acid chloride and the sulfonic acid ester of a hydroxyl group of the butyrated cellulose structure— thus giving a sulfonic acid ester linkage between the two polymers.

Another indication of polymer formation through crosslinking between the chlorosulfonated polyethylene and the butyrated cellulose was the surprising observation that incorporation of the latter polymer—well known to exhibit poor flexibility at subzero temperatures—into a commercial coating formulation of a chlorosulfonated polyethylene using lead trimaleate accelerated with thiuram disulfide crosslinking system actually showed no lowering in flexibility of the more flexible commercial system at a temperature of −20° F. Without interaction the incorporation of a brittle ingredient into a more flexible system would of course give flexibility between the values for the two materials—or even below the value for either material.

The amount of cellulose butyrate polymer incorporated into the chlorosulfonated polyethylene depends upon the final use to be made of the coating. It has been found that the higher the amount used the greater the non-blocking properties. The term blocking as used herein refers to sticking together of coated panels as they are stacked after coating—film must be tacky to block. However, there is a corresponding decrease in the weather and solvent resistance of the film. Furthermore with higher concentrations of cellulose butyrate the number of crosslinking sites, —$SO_2Cl$, is decreased and thus softer films with greater flexibility are attained. Generally, except for a few specialty coatings, the most desirable concentration of the cellulose butyrate polymer ranges from 10 to 40 percent with 90 to 60 percent chlorosulfonated polyethylene.

The butyrate content of the cellulose butyrate polymer also governs to what extent this polymer may be used in the coating. It has been found that the greater the butyrate content the greater the amount of cellulose derivative that can be incorporated. The butyrate content also plays a large role in the clarity of the films obtained in the cured state of the polymers. The higher the butyrate content the clearer the films. Whereas this specific property is not very important in pigmented systems its secondary affect lies in the solvents which can be used in the pigmented polymer systems. With a decrease in the butyrate content there is a corresponding decrease in the amount of the cheaper aromatic solvents that can be utilized in the systems. The butyrated cellulose containing higher acetate contents require larger portions of the more costly ester and ketone type solvents.

The butyrate content of the cellulose polymer also plays an important role in the properties of the cured system under cryogenic conditions. Generally increasing butyryl content contributes to better flexibility. The cellulose butyrate esters containing all butyryl content used in accordance with this invention give excellent low temperature flexibility.

The variation in the composition of the chlorosulfonated polyethylenes plays a large role in the properties of the coating. Chlorosulfonated polyethylenes of low chlorine content, e.g., 25 to 30 percent by weight, are preferably used in mixtures containing at least 40% of total nonvolatile as butyrated cellulose. However, polymers containing the high chlorine content e.g., 40 to 45 percent, can produce an excellent non-blocking coating with a cellulose butyrate content as low as 20 percent. Further differences between the low and high chlorine content become evident in the infra-red studies conducted on the cured and uncured films. The low chlorine content polymer does not exhibit the shift to sulfonic acid ester to the same degree as the high chlorine member.

Examples I through IV describe the preparation of a selective group of coating compositions based on blends of butyrated cellulose esters and chlorosulfonated polyethylenes.

EXAMPLE I

| | Pounds |
|---|---|
| Methyl isobutyl ketone | 50 |
| Xylene | 10.4 |
| Cellosolve | 5.4 |
| Chlorosulfonated polyethylene whose composition contains 41.5 to 44.5 percent chlorine and .95 to 1.25 percent sulfur (Hypalon 30) | 23.9 |
| Cellulose butyrate whose composition contains approximately 50 percent butyrate and 0.6 percent hydroxy (EAB-500-5) | 10.3 |

The above concentrate is prepared by placing all of the ingredients in a suitable container and agitating until the polymers are in solution. This concentrate can then be reduced with proper solvents such as ketones to the desired viscosity for application; spray, curtain coating, brush, dip, etc.

Prior to application a small amount of an amine, .01 to .05 equivalent per 100 parts of chlorosulfonated polyethylene is added to the systems. An example of a suitable amine is diethylene triamine.

The above product is an excellent clear coating for plaster wall board. This product is especially effective for sealing wall board in areas of high humidity and can be recoated with any of the available decorative coatings.

EXAMPLE II

Part A

| | Pounds |
|---|---|
| Lampblack | 4.15 |
| Graphite | 30.72 |
| Thixotropic agent MPA 69 (Baker Castor Oil Co.) | 6.22 |
| Partially hydrogenated wood rosin (Staybelite resin; Hercules Powder Co.) | 6.22 |
| Cellosolve | 35.65 |
| Pigment dispersing agent (Nuosperse 657; Nuodex Products Co.) | 2.10 |
| Silicone Oil (SF-69; General Electric Co.) | .04 |
| Xylene | 120.98 |

Part B

| | |
|---|---|
| Chlorosulfonated polyethylene of composition 27 to 31 percent chlorine and 1.25 to 1.55 percent sulfur (Hypalon 20) | 112.46 |
| Cellulose butyrate of composition approximately 50 percent butyrate and 0.6 percent hydroxy (EAB-500-5) | 28.22 |
| Xylene | 75.74 |
| Methyl isobutyl ketone | 267.43 |
| Cellosolve | 31.55 |

Part B is charged to a suitable container and agitated until the polymers have completely dissolved.

Part C

| | Pounds |
|---|---|
| Silica flatting pigment (Syloid PD-162; Davidson Chemical Co.) | 32.08 |

Part A is charged into a burr ball mill and rotated for 6 to 8 hours: 58.26 lbs. of Part B is added. The material is then further rotated in the burr ball mill overnight until the pigments are properly dispersed. Part C is then added and rotation is continued for another hour.

The remaining portion of Part B is then added and mixed until a uniform dispersion is attained.

The above product is a superior coating for elastomeric substances and exhibits excellent flexibility under cryogenic conditions.

EXAMPLE III

Part A

| | Pounds |
|---|---|
| Rutile titanium dioxide pigment | 113.04 |
| Calcium carbonate extender pigment | 39.95 |
| Partially hydrogenated wood rosin | 2.44 |
| Thixotropic agent MPA-60 | 24.36 |
| Pigment grinding Aid—Nuosperse 657 | 1.94 |
| Xylene | 144.72 |
| Cellosolve | 24.57 |

Part B

| | |
|---|---|
| Chlorosulfonated polyethylene of composition 41.5 to 44.5 percent chlorine and .95 to 1.25 percent sulfur (Hypalon 30) | 115.96 |
| Cellulose actate butyrate of composition approximately 50 percent butyryl and .6 percent hydroxyl (EAB-500-5) | 48.72 |
| Silicone oil SF-69 | .07 |
| Xylene | 59.54 |
| Methyl isobutyl ketone | 224.24 |
| Cellosolve | 24.57 |

Part C

| | |
|---|---|
| Methyl isobutyl ketone | 45.49 |

The pigment paste (Part A) is ground overnight in a burr ball mill. To it is added the resin concentrate (Part B) which has been solubilized via the techniques used in previous examples. The resin solution is added slowly under heavy agitation to insure adequate wetting and prevent pigment agglomeration. This pigmented concentrate is then reduced with the remaining ketone solvent Part C.

Prior to application a small amount of amine as described in previous Example I is added. Articles coated are baked for 2 minutes at 120° F. for solvent flash off and then 5 minutes at 250° to 275° F.

The above coating exhibits exceptional non-blocking characteristics when applied to various wood sidings notably "Crezon" (a phenolic paper laminated plywood board). This coating possesses good durability on outer exposure.

EXAMPLE IV

Part A

|  | Pounds |
|---|---|
| Rutile titanium dioxide | 105.54 |
| Yellow oxide | 7.95 |
| Burnt umber | 4.06 |
| Molybdate orange | .25 |
| Calcium carbonate | 41.61 |
| Partially hydrogenated rosin (Staybelite Resin) | 2.54 |
| Thixotropic agent MPA-60 | 25.37 |
| Pigment dispersing agent | 2.02 |
| Xylol | 201.82 |
| Cellosolve | 25.58 |

Part B

| | |
|---|---|
| Chlorosulfonated polyethylene containing 41.5 to 44.5 percent chlorine and .95 to 1.25 percent sulfur (Hypalon 30) | 129.1 |
| Cellulose acetate butyrate containing 50 percent butyryl and .6 percent hydroxyl (EAB-500-5) | 32.28 |
| Silicone oil SF-69 | .07 |
| Xylol | 58.03 |
| Methyl isobutyl ketone | 218.44 |
| Cellosolve | 23.95 |

The resin concentrate (Part B) is dissolved by the technique used in Example I.

Approximately 400 pounds of the resin concentrate is added to Part A and the mixture ground in a burr ball mill for 15 to 20 hours or until an acceptable grind is attained. The remaining portion of Part B is then added.

The pigmented coating is reduced with suitable solvents for the desired method of application.

The above coating is an excellent hiding base for wood panelling. Graining inks have superior adhesion for this base thereby enhancing its use on paneling for interior decorative use.

Coatings as illustrated by Examples I through IV have excellent conversion properties to give tack-free coating films of good physical strength and durability and they are highly resistant to the atmospheric elements to which protective coatings are normally exposed.

Various changes and modifications of the invention can be made and, to the extent that such variations incorporate the spirit of this invention, they are intended to be included within the scope of the appended claims.

What is claimed is:

1. A film-forming product comprising chlorosulfonated polyethylene and a butyrated cellulose in the ratio of from about 90:10 to 60:40 parts by weight, respectively.

2. A resinous product suitable for the formation of protective coatings having a substantially tack-free character and having good cryogenic properties comprising chemically bonded chlorosulfonated polyethylene and a butyrated cellulose in the ratio of from about 90:10 to 60:40 parts by weight, respectively.

3. A resinous coating having tack-free characteristics at elevated temperatures and good cryogenic properties comprising a film-forming amount of chemically chlorosulfonated polyethylene and a butyrated cellulose in the ratio of from about 90:10 to 60:40 parts by weight, respectively.

4. A coating composition capable of forming tack-free protective coatings, said composition being an organic solvent solution of a chlorosulfonated polyethylene and a butyrated cellulose in the ratio of from about 90:10 to 60:40 parts by weight and 0.01 to 0.05 equivalent of an organic amine per 100 parts of the chlorosulfonated polyethylene based on an equivalent weight of amine containing one amine nitrogen.

5. A coating composition capable of hardening at room temperature and by heat treatment to form tack-free protective coatings, said composition being an organic solvent solution of a chlorosulfonated polyethylene and a butyrated cellulose in the ratio of from about 90:10 to 60:40 parts by weight and 0.01 to 0.05 equivalent of an organic amine per 100 parts of the chlorosulfonated polyethylene based on an equivalent weight of amine containing one amine nitrogen.

6. A coating composition capable of hardening at room temperature and by heat treatment to form tack-free protective coatings, said composition being an organic solvent solution of a chlorosulfonated polyethylene and a butyrated cellulose in the ratio of from about 90:10 to 60:40 parts by weight, 0.01 to 0.05 equivalent of an organic amine per 100 parts of the chlorosulfonated polyethylene based on an equivalent weight of amine containing one amine nitrogen, 20 to 40 parts litharge per 100 parts of the chlorosulfonated polyethylene and 1 to 4 parts tetraethyl thiuram disulfide per 100 parts of the chlorosulfonated polyethylene.

No references cited.

WILLIAM H. SHORT, *Primary Examiner.*

J. NORRIS, *Assistant Examiner.*